Dec. 25, 1951  K. E. SUMMERS  2,580,255
DISTANCE GAUGE
Filed Feb. 24, 1948  3 Sheets-Sheet 1

INVENTOR
K. E. Summers

By Watson, Cole, Grindle & Watson

Dec. 25, 1951    K. E. SUMMERS    2,580,255
DISTANCE GAUGE

Filed Feb. 24, 1948    3 Sheets-Sheet 2

INVENTOR
K. E. Summers

By Watson, Cole, Grindle
    & Watson

Dec. 25, 1951  K. E. SUMMERS  2,580,255
DISTANCE GAUGE
Filed Feb. 24, 1948  3 Sheets-Sheet 3

INVENTOR
K. E. Summers
By Watson, Cole, Grindle
& Watson

Patented Dec. 25, 1951

2,580,255

UNITED STATES PATENT OFFICE 2,580,255

DISTANCE GAUGE

Kenneth Edward Summers, Peterborough, England, assignor to The Newall Engineering Company Limited, Peterborough, England, a British company Application February 24, 1948, Serial No. 10,363
In Great Britain February 12, 1945

Section 1, Public Law 690, August 8, 1946
Patent expires February 12, 1965

7 Claims. (Cl. 33—125)

This invention comprises improvements in or relating to measuring apparatus. It is common practice in engineering workshops to employ sets of blocks or slip gauges which are highly finished and made with opposite parallel faces, the distances between which vary from piece to piece in graded steps which are so chosen that by selecting suitable blocks or slip gauges and placing them together any desired dimension within the range of the set of gauges chosen can be arrived at, the assembled set of blocks or gauges being then used as a composite gauge for machining or ascertaining the dimensions of workpieces which are being operated upon. Such sets of gauges being open to the atmosphere are liable to become damaged or dirty and their accuracy thereby impaired.

It has been previously proposed to provide a measuring instrument with a movable and a fixed headstock having adjustable bolts between which loose gauge pins of different lengths are manually placed end to end, the movable headstock includes a stationary bolt and a piston carrying the adjustable bolt, and a revolver head in the headstock carries other gauge pins of different lengths which on rotation of this head are inserted in turn between the piston and stationary bolt, contact between these members being ensured by a helical spring acting on the piston.

It is one object of the present invention to provide a convenient apparatus for rapidly setting up a set of gauges to afford a given total dimension; it is a second object of the invention to provide for the protection of the gauges so that they do not become readily damaged or dirty. It is a third object of the invention to provide an apparatus in which the dimension which has been set up by the selection of the gauges is obvious to the operator so that mistakes are easily avoided and it is a fourth object of the invention to provide an apparatus which is readily adapted for employment on and in connection with machine tools such as jig borers and the like.

According to the present invention a gauge-holder comprises in combination a support, a plurality of relatively movable carriers on the support, a set of gauge elements in each carrier the elements in one carrier having dimensions which increase stepwise by a predetermined increment from element to element, the dimensions of elements in another carrier increasing stepwise by fractions of the increment of those in the first carrier and in another carrier or carriers (if provided) by still smaller increments, means to move each carrier so as to bring any selected gauge element carried thereby into an operative position in which the selected gauge elements of the carriers are in line, and means to cause the selected gauge elements in the operative position to come in contact with one another so that they together afford an overall measurement made up of the lengths of the selected gauge elements.

In the preferred construction the carriers are rotatable about an axis common to them all and the gauge elements are slidable in the carriers parallel to the axis. The carriers are rotatable by engagement with an actuating member which is so mounted as to be slidable along or parallel with the axis of the carriers to engage any one carrier at will.

It is an important feature of the invention that the carriers, or parts movable therewith, are each marked with a series of numbers to indicate the dimension of the gauge element which is at the operative position at any given time, the numbers being arranged to appear in a series at a viewing point so that the total dimension set up by the combination of elements which are in line at the operative position can be readily observed by inspection of the numbers.

The carriers and gauge elements are preferably enclosed within a casing upon the support for the purpose of excluding dust and the casing is provided with a window to show the setting of the parts within. The whole device may be constructed as a unit which is adapted to fit a gauge bar such as the gauge bar on a jig borer or like machine tool and thus the gauge-holder according to the present invention will serve for a locating micrometer.

The following is a description by way of example of one form of gauge-holder in accordance with the invention:

In the accompanying drawing—

In Figure 3 the line 2—2 shows the irregular plane upon which the section of Figure 2 is taken.

Figure 1:
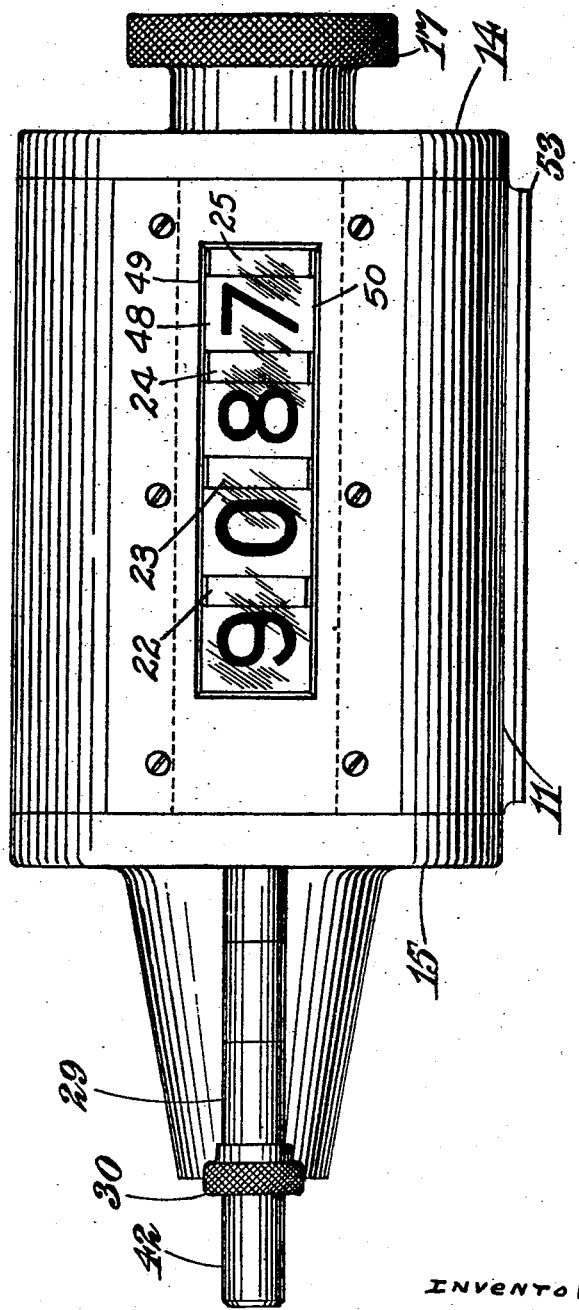
Figure 1 is a plan of the gauge-holder.
Figure 2:
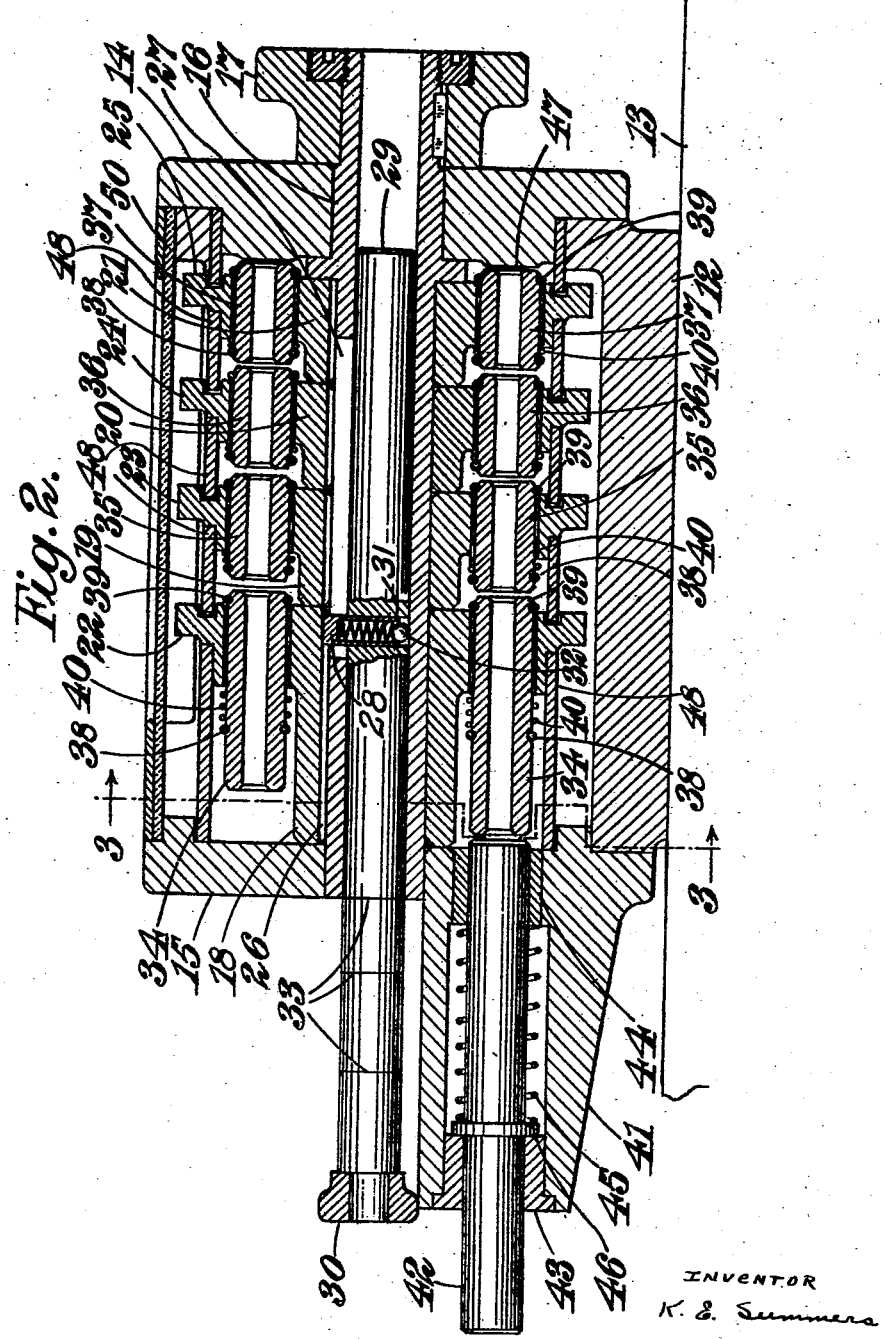
Figure 2 is a vertical longitudinal section through the same.
Figure 3:
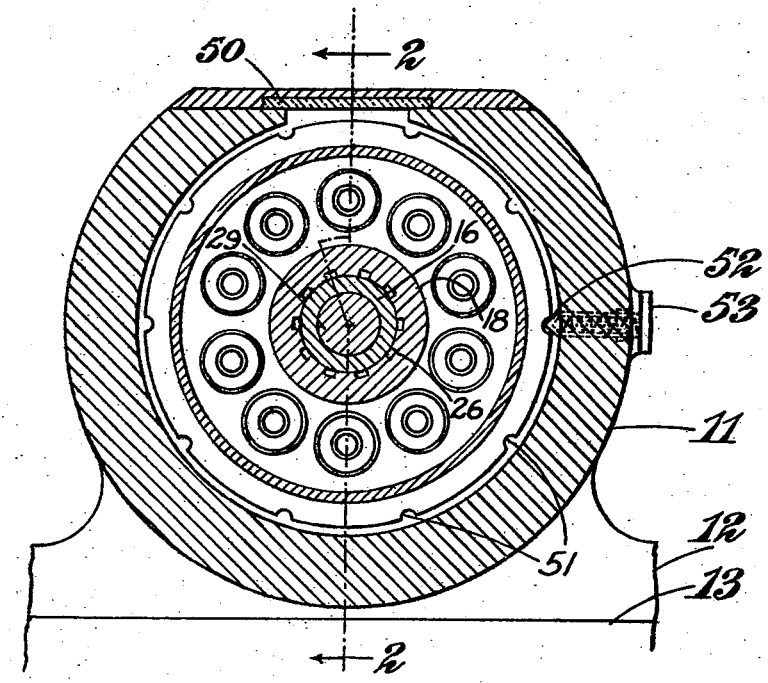
Figure 3 is a cross-section upon the line 3—3 of Figure 2 looking in the direction of the arrows.

The gauge-holder comprises a circular casing 11 which is formed in one piece with a base 12 and the base is adapted to be secured to a carrier 13 which can carry locating means not shown in the drawing such as a hardened spherical surface and a wedge-shaped surface for engaging a gauge bar or locator such as a series of rollers as used for locating micrometer heads in jig borers and like machine tools.

The casing 11 has two end plates 14, 15 and journalled in the end plates concentrically with the casing is a rotatable hollow operating spindle 16 which projects beyond the casing at one end and carries a knurled head 17. Upon the operating spindle 16 there are journalled four carriers 18, 19, 20, 21. Each carrier consists of a hub and a flange the flanges being numbered in the drawing 22, 23, 24, 25. The hubs are provided with internal keyways 26 and the hollow spindle 16 has a longitudinal slot 27 in one side for the passage of a sliding key 28. The key 28 is carried in a slider 29 within the spindle which projects from the spindle at the opposite end to the knurled head and terminates in a knob 30. By moving the slider along, the key 28 can be brought into engagement with any one of the carriers 18 to 21. The key 28 slides in a cross bore in the slider 29 and is urged outwardly into engagement with the keyways of the carriers by a spring 31 which presses on a ball 32 also located in the cross bore in the slider. The slider 29 is marked with lines 33 around its surface at each of the positions which corresponds to proper engagement with one of the carriers.

The flange of each carrier is bored parallel to its axis with a circular series or ring of 10 equal sized holes and in each of the holes there is slidably mounted a gauge element.

The gauge elements of the carrier 18 are marked 34 in the drawing, the gauge elements of the carrier 19 are marked 35, of the carrier 20 are marked 36 and of the carrier 21 are marked 37.

Each gauge element consists of a hardened and ground steel cylinder which is drilled axially through its centre so as to be hollow and is machined on its external surface to be a sliding fit in the hole in which it works in its carrier. Each gauge element is grooved at one end to receive a wire retainer 38 and is also grooved on the opposite side of the flange of the carrier to receive a second retainer 39. Between the retainer 38 and the flange of the carrier there is interposed a spiral spring 40 and thus all the gauge elements are urged by their springs in one direction and normally the retainer 39 which encircle their ends abut against one of the faces of each carrier.

The carrier 18 supports a circular set of gauge elements 34 the dimensions of which differ from each other by one tenth of an inch so that the shortest element of this set is exactly one inch shorter than the longest element. The next carrier 19 supports a circular set of gauge elements 35 the dimensions of which differ from one another stepwise by one hundredth of an inch; the third carrier 20 has elements 36 which differ from one another by one thousandth of an inch and the fourth carrier 21 has elements 37 the difference between the lengths of which varies stepwise by one ten-thousandth of an inch.

The lower part of the end cover 15 of the casing 11, namely the cover which is remote from the knurled head 17, is extended parallel to the axis of the casing to provide a support 41 for a sliding anvil 42. This anvil is axially in line with the circular sets of gauge elements 34, 35, 36, 37 at the lowermost position. It slides through a bush 43 which fits it closely at the outer end of the extension and through a second bush 44 which supports it close to the end of the gauge elements. Between the two bushes it is surrounded by a spiral spring 45 which abuts on a collar 46 on the anvil shank 42 and urges the anvil outwards. In line with the anvil and the gauge element within the cover 14 at the other end of the casing there is a fixed face 47 and if the anvil is urged inwardly against its spring it will compress the gauge elements against their springs until they are all touching one another and the last one is touching the face 47 of the cover 14. In this position the anvil will be displaced to an extent which corresponds to the particular assembly of four gauge elements which has been selected and brought into line opposite the anvil.

Each of the flanges 22 to 25 of the carriers 18 to 21 has a cylindrical outer portion which supports a number-ring 48. The number-rings 48 are arranged to appear in a series below a window 49 provided with a transparent cover 50 in the top of the casing. The number-rings are each engraved with a series of figures from 0 to 9 and the figures are arranged to correspond with the dimensions of the gauge elements so that when a given gauge element is in the operative position its corresponding number will appear in the window 50. Thus if the gauge element 34 corresponding to nine tenths of an inch is in position behind the anvil shank the number 9 will appear in the window on the number-ring of the flange 22. The number-ring on the next carrier will show, say, 0 if the gauge element corresponding to zero hundredths (i. e. the gauge element which is of minimum length on the carrier 19) is in place; similarly the next ring might show eight thousandths and the last one seven ten-thousands; if this were the case it would indicate that gauge elements corresponding to 0.9087 inch had been selected and were in position behind the anvil. This does not of course mean that the total length of the four selected gauge elements is 0.9087″, but that their total length is 0.9087 inch longer than the total of the four elements which are of minimum length. The four elements of minimum length, which show zeros on the number-rings 48, afford when together a minimum position of the anvil 42 which is taken as the starting point for measurements.

In order to ensure that the elements are correctly centred relatively to one another when in their operative position, each of the flanges 22 to 25 of the carrier rings extends radially outwards between the number-rings and is provided with 10 circumferential notches 51. A series of four spring plungers 52 is provided, one for the periphery of each carrier ring, and the spring plungers drop into the notches and centre the parts. The springs plungers are backed up by a cover plate 53.

I claim:

1. A gauge-holder comprising in combination a support, a plurality of relatively movable carriers on the support, a set of gauge elements in each carrier and movable relatively to the carrier in a direction toward and away from the gauge elements in other carriers, the elements in one carrier having dimensions of length which increase stepwise by a predetermined increment from element to element, the dimensions of elements in each succeeding carrier increasing stepwise by fractions of the increment of those in the preceding carrier, means to move each carrier so as to bring any selected gauge element carried thereby into an operative position in which the selected gauge elements of the carriers are in line, and means to move the selected gauge elements with respect to their carriers when in said operative position to bring them into contact with one another so that they together afford an overall measurement made up of the lengths of the selected gauge elements.

2. A gauge-holder as claimed in claim 1, wherein the carriers are rotatable about an axis common to them all and the gauge elements are slidable in the carriers parallel to the axis.

3. A gauge-holder as claimed in claim 2, wherein the means to rotate each carrier comprises a rotary actuating member and means upon each carrier engageable by said member, the actuating member being mounted on the support for axial sliding in a direction parallel to the common axis of the carriers into engagement with said engageable means upon any one carrier at will.

4. A gauge-holder as claimed in claim 1, wherein the carriers are each marked with a series of numbers to indicate the dimension of the gauge element which is at the operative position at any given time, the numbers being arranged to appear in a series at a viewing point so that the total dimension set up by the combination of elements which are in line at the operative position can be readily observed by inspection of the numbers.

5. A gauge-holder comprising in combination a support, a plurality of carriers on the support and rotatable relative to one another about an axis common to them all, a set of gauge elements in each carrier each of which gauge elements is slidable with respect to its carrier in a direction parallel to the common axis of the carriers, the elements in one carrier having in said direction of sliding dimensions of length which increase stepwise by a predetermined increment from element to element, the dimensions of elements in each succeeding carrier increasing stepwise by fractions of the increment of those in the preceding carrier, means to rotate each carrier so as to bring any selected gauge element carried thereby into an operative position in which the selected gauge elements of the carriers are in line, and means to cause the selected gauge elements in the operative position to slide into contact with one another so that they together afford an overall measurement made up of the lengths of the selected gauge elements.

6. A gauge-holder as claimed in claim 5, wherein the means to rotate each carrier comprises a rotary actuating member and means upon each carrier engageable by said member, the actuating member being mounted on the support for axial sliding in a direction parallel to the common axis of the carriers into engagement with said engageable means upon any one carrier at will.

7. A gauge-holder as claimed in claim 5, wherein the carriers are each marked with a series of numbers to indicate the dimensions of the gauge element which is at the operative position at any given time, the numbers being arranged to appear in a series at a viewing point so that the total dimension set up by the combination of elements which are in line at the operative position can be readily observed by inspection of the numbers.

KENNETH EDWARD SUMMERS.

REFERENCES CITED

The following references are of record in the file of this patent:

UNITED STATES PATENTS

| Number | Name | Date |
| --- | --- | --- |
| 1,213,134 | Fellows | Jan. 16, 1917 |
| 1,452,834 | Fuchs | Apr. 24, 1923 |
| 1,857,088 | Parkhurst | May 3, 1932 |
| 1,877,981 | Schafer | Sept. 20, 1932 |
| 2,158,649 | Armitage | May 16, 1939 |
| 2,399,703 | White | May 7, 1946 |

FOREIGN PATENTS

| Number | Country | Date |
| --- | --- | --- |
| 537,636 | France | Mar. 7, 1922 |
| 591,828 | Great Britain | Aug. 29, 1947 |